H. HESS.
ROLLER BEARING.
APPLICATION FILED JAN. 2, 1907.
980,101.
Patented Dec. 27, 1910.
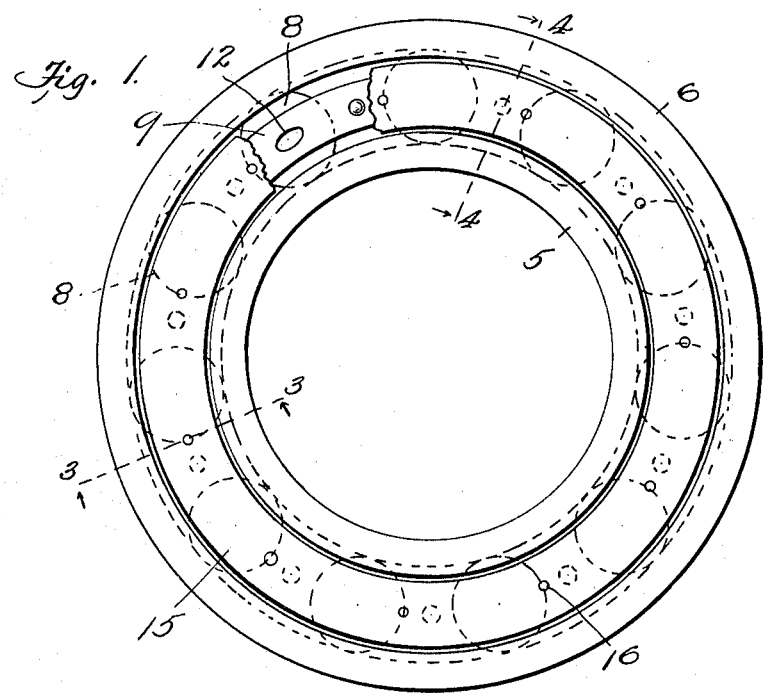
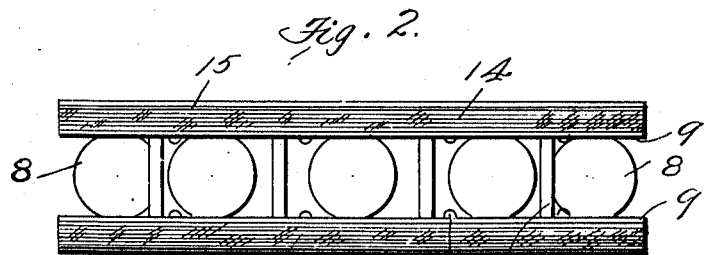
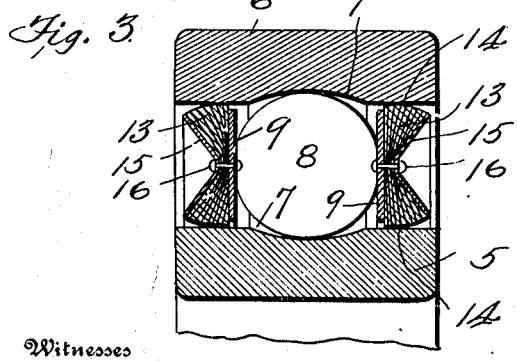
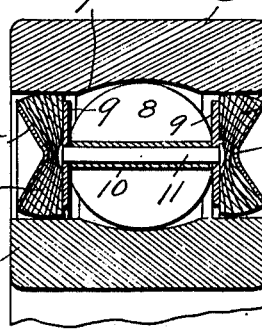
Witnesses
Chas K. Davies.
N. E. Costello.
Inventor
Henry Hess,
By Bucks Smith
Attorneys

UNITED STATES PATENT OFFICE.

HENRY HESS, OF PHILADELPHIA, PENNSYLVANIA.

ROLLER-BEARING.

980,101.

Specification of Letters Patent.   Patented Dec. 27, 1910.

Application filed January 2, 1907. Serial No. 350,414.

*To all whom it may concern:*

Be it known that I, HENRY HESS, a citizen of the United States, and a resident of Philadelphia, in the county of Philadelphia and State of Pennsylvania, have invented a new and useful Roller-Bearing, of which the following is a specification.

My invention relates to roller-bearings and has for a primary object the provision in such a bearing of means for excluding foreign matter from the bearing and for retaining lubricant within it.

Other objects and advantages of my invention will be more definitely set forth hereinafter in connection with the detailed description of the accompanying drawing which illustrates an exemplifying structure in which my invention is embodied, and in which—

Figure 1 is an end view of a bearing embodying my invention, certain parts of the structure being broken away; Fig. 2, a plan view of the bearing with the outer bearing ring removed; Fig. 3, a section at 3—3, Fig. 1; and Fig. 4, a section at 4—4, Fig. 1.

I have chosen as a mechanical embodiment of my invention a ball-bearing of the annular, non-adjustable type, but it is to be understood that the principal feature of the invention—the means for excluding dirt and retaining lubricant—may be employed in connection with bearings having other forms of rollers than balls, or in adjustable bearings. Further, in the specific embodiment of the invention I employ a cage or spacing device for separating the balls from each other, and the means for excluding dirt and retaining lubricant are assembled in connection with parts of this cage or separator; but it is to be understood that such means may be employed in connection with bearings of the "full" type (that is, employing no cage or separator), or if such a cage is used that the dirt-excluding and lubricant retaining devices may be independent of such separating device.

Proceeding now with a description of an exemplifying embodiment of my invention: Reference numeral 5 designates an inner bearing-ring; 6, an outer bearing-ring; 7, races of curved cross-section formed in the rings; 8, balls in the races; 9, separator rings, one on each side of the bearing; 10, sleeves or spreaders interposed between the balls and spacing rings 9 the proper distance apart; 11, rivets passing through the spreaders and rings 9 and headed up so as to hold the rings against the spreaders; 12, (see Fig. 1) holes in ring 9 of any suitable shape but preferably made oval, as shown, which permit a segment of the corresponding ball to be engaged by rings 9 and so maintain the balls at the proper distance apart and yet permit a certain amount of relative movement of the balls toward and from each other.

The spreaders 10 and rivets 11 are only representative of means for holding separator rings 9 in proper relation to the balls, and the holes 12 in the rings are only representative of means for spacing the balls apart. Instead of perforations entirely through rings 9, depressions in the rings on the sides adjacent to the balls may be substituted, or holes and depressions may be dispensed with and the separator rings drawn together between each two balls so that the spring action of the rings themselves tends to return the balls to a central position between the spreaders when displaced therefrom.

The parts described constitute a complete ball-bearing which has been described in detail as being especially adapted for the application of my dirt-excluding and oil-retaining device, one form of which will now be particularly described.

13 are packing or sealing washers of felt or woven fabric or other suitable material, one at each side of the row of balls, lying against one of the separator rings 9; these washers are of such width as to touch the cylindrical bores 14 of the bearing-rings at each side and completely close the opening between the rings so as to exclude exterior dirt, etc., and retain lubricating material such as vaseline, etc., which may be placed in the ball races between the separator rings 9.

15 are spring rings conveniently of V-section, as shown, one placed outside of each of the washers 13 and secured in place by rivets 16 passing through them, the washers, and separator rings 9.

The outer and inner surfaces of washers 13 are preferably rounded off, as shown. The V-shaped rings 15 are preferably made of thin spring metal and in their normal condition before being put in place on the washers the angle of intersection of the two flanges of the ring is greater than shown in Fig. 3. When the rings are put in position and riveted down, therefore, they are under initial tension, and the flanges tend to spread out to a wider angle, so that as the washers wear away where they contact with the bearing rings, this wear is compensated for by the spring rings compressing the material of the washers continually into contact with surfaces 14.

I consider it a very desirable and economical arrangement to mount the washers 13, etc., upon a device which forms a part of a separator such as ring 9. Obviously, however, no part of the dirt-excluding and oil-retaining device need be associated with the separator member. Rings 9 may serve only to separate the washers 13, etc., and in this case they need have no active contact with the balls, and spreaders 10 and rivets 11 will simply serve to hold the dirt-excluding and oil-retaining devices in proper assembled position in the bearing.

The particular sealing devices described are only representative of any suitable means applied directly to a bearing of the type described and forming an integral part of the bearing, for excluding dirt and retaining lubricant, and many variations in the form and details of such devices may be made without departing from my invention.

From the foregoing it appears that broadly considered my invention consists in means assembled as a part of a roller-bearing for excluding dirt and retaining lubricant; and more specifically it consists, when employed in connection with an annular bearing of the non-adjustable type, of means for sealing the opening between the rings of such a bearing; and that when employed in connection with bearings containing a cage or separator in some cases it may consist in combining the sealing devices with a portion of such cage.

I claim:

1. In a non-adjustable ball-bearing forming a self-contained operative unit, the combination of an inner and an outer bearing ring, a series of balls running in races therein, washers serving to close the space between the bearing rings, and means urging the washers into contact with said rings.

2. In a unit assembled ball bearing, the combination of an inner and an outer bearing ring, a series of balls running in races therein, washers serving to close the space between the bearing rings, and spring rings applied to the washers and exerting a pressure serving to keep the washers always in contact with the rings.

3. In a non-adjustable ball-bearing, the combination of an inner and an outer bearing ring, balls running in races therein, a separator for spacing the balls apart, and washers one on each side of the balls secured to members of the separator, and devices applied to the washers for maintaining them in active contact with the bearing rings.

4. In a ball-bearing, the combination of an inner and an outer bearing ring, a series of balls running in races therein, an annular plate at each side of the ball series, said plates being secured together and serving to space the balls apart, a sealing washer on each of the plates, and a spring ring outside each of the washers and secured to the corresponding plate serving to hold the washer in active contact with the bearing rings.

5. A non-adjustable ball bearing comprising two bearing rings and balls running in races therein, said bearing rings being spaced apart adjacent to the balls, sealing devices free to rotate in relation to both of the rings and serving to close the spaces between the rings, and means for retaining the sealing devices in close contact with the rings.

6. The combination of two bearing rings provided with races, a series of balls in the races, the bearing rings being spaced apart on each side of the ball series, flat rings, one on each side of the ball series, means for connecting said rings, V-shaped spring rings, one connected to each of the flat rings, and washers, one secured between each of the spring rings and the corresponding flat ring, the edges of the washers being in contact with surface edges of the bearing rings and serving to exclude dirt and retain lubricant.

7. In a unit assembled ball bearing, the combination with two bearing rings provided with confronting races and a series of balls in the races, the rings being separated from each other on each side of the ball series, of retaining rings on each side of the ball series and provided with means for engaging and spacing the balls apart, a connection between the retaining rings, a yieldable sealing device carried by each ring and means for urging the sealing device into contact with the bearing rings so as to close the spaces between said rings.

In testimony whereof I have affixed my signature in the presence of two witnesses.

HENRY HESS.

Witnesses:
 THEO. H. M'CALLA,
 NETTIE L. HAHN.